June 4, 1957

S. D. LAWSON 2,794,710

PREPARATION OF CARBON BLACK FEED STOCKS
AND THEIR CONVERSION TO CARBON BLACK

Filed Sept. 13, 1954

INVENTOR.
S. D. LAWSON
BY
ATTORNEYS

United States Patent Office 2,794,710  
Patented June 4, 1957

2,794,710

PREPARATION OF CARBON BLACK FEED STOCKS AND THEIR CONVERSION TO CARBON BLACK

Shelby D. Lawson, Bartlesville, Okla., assignor to Phillips Petroleum Company, a corporation of Delaware Application September 13, 1954, Serial No. 455,419

17 Claims. (Cl. 23—209.4)

This invention relates to the production of carbon black. In one aspect it relates to a method for the preparation of a feed stock oil for use in making carbon black by a furnace process. In another aspect it relates to a method for the preparation of a feed oil for use in making a furnace type carbon black without slagging of the refractory liner of the carbon black furnace.

I have found that in the production of a furnace type of carbon black when using certain oil feed stocks the refractory liner of the combustion zone and of the reaction zone tends to slag. By slagging I mean the surface of the refractory becomes softened thereby allowing deterioration of the liner. When the refractory liner becomes softened at its high temperature of operation, prolonged use of the furnace in this condition can cause a softening of the entire body of the liner thereby causing the normally circumferential combustion zone and reaction zone to become deformed in shape. Upon shutting down a furnace in this condition the line sometimes crazes or even spalls. Such a condition of a carbon black production furnace is highly undesirable.

An object of my invention is to provide a process for the production of an oil feed for a furnace carbon black producing operation which oil does not cause slagging of the refractory in the carbon black production furnace.

Another object of my invention is to provide an oil feed for the production of a furnace type of carbon black which process is relatively inexpensive to operate for the production of suitable oil feed stock which does not cause slagging of the refractory liner in a carbon black furnace.

Still another object of my invention is to provide a process for the production of a non-slagging furnace carbon black feed stock oil which process produces oils suitable for the production of carbon black without any substantial loss of oil.

Still other objects and advantages of my invention will be realized upon reading the following disclosure and drawing which describes and illustrates, respectively, a preferred embodiment of my invention.

I have found when using one or more of such oils as light cycle oil, heavy cycle oil, and decant oil obtained from a fluid catalytic cracking operation, that the slagging of the carbon black furnace refractory liner occurs under some conditions. The above-mentioned oils obtained from a fluid catalytic cracking operation employing a silica alumina catalyst are obtained by fractionating the catalytic cracker effluent in one or more fractionating steps. The light cycle oil and the heavy cycle oil are distillate oils and can be taken either as overhead oils or one or both can be taken as side streams. In the fractionation of the effluent of a fluid catalytic cracker the bottoms product is frequently called a slurry because it contains at least a minor amount of very finely divided catalyst. This slurry is ordinarily conveyed to a settling tank and the solid catalyst is given an opportunity to settle. When the catalyst has settled it is withdrawn as a thickened slurry and is returned into the fluid cracking operation for recovery of the catalyst. The clear or relatively clear, that is, the catalyst-free or substantially catalyst-free supernatant oil is decanted from the catalyst settlings and this decanted oil is herein called "decant" oil.

In Table I are given inspection data of each a light cycle oil, a heavy cycle oil, and a decant oil which produce slagging in some carbon black furnaces. These oils are used as a feed stock for the production of carbon black according to my invention.

Table I

|  | Light Cycle | Heavy Cycle | Decant Oil |
|---|---|---|---|
| API° Gravity, 60/60° F | 33.7 | 31.2 | 22.8 |
| IBP, ° F | 252 | 288 | 592 |
| 5% Evap., °F | 428 | | 701 |
| 10% Evap., °F | 456 | 570 | 755 |
| 40% Evap., °F | 499 | 606 | 793 |
| 50% Evap., °F | 504 | 617 | (Cracked 798) |
| 70% Evap., °F | 517 | 642 | |
| 90% Evap., °F | 541 | 687 | |
| EP., °F | 580 | 731 | |
| Rec., Vol. Percent | 99.0 | 99.0 | |
| Resid., Vol. Percent | 1.0 | 1.0 | |

These three oils can be used separately as feed stock to the process of my invention or all three can be used or a blend of any two.

In the production of carbon black by a furnace method wherein the hydrocarbon feed for the production of carbon black is an oil it is known that highly aromatic oils produce better quality carbon black for many purposes and in higher yield per gallon of oil feed than non-aromatic oils.

A suitable method for making a high quality carbon black is described in U. S. Patent 2,564,700 and the two carbon black furnaces which I have illustrated in the drawing are of the general type described in said patent. Likewise, these two carbon black furnaces are operated in the same general manner as described in said patent.

However, one of the furnaces is smaller than the other and under some conditions slagging of the refractory liner in the smaller furnace occurs. One of the conditions under which slagging of the refractory liner in the smaller furnace occurs is when a solvent extract oil from a fluidizing catalytic cracking operation is used as feed stock. For a reason which I cannot explain, when the same oil is used in the production of carbon black in the larger of the two furnaces, slagging of the refractory liner does not occur. When the solvent extract from, for example, a liquid sulphur dioxide extraction operation is treated with anhydrous ammonia for neutralizing final traces of sulphur dioxide and this so treated oil used as feed in the small carbon black furnace slagging of the refractory occurs while when the same treated oil is used in the larger furnace slagging of the refractory liner does not occur.

By the terms "a small carbon black production furnace" and "a large carbon black production furnace" I mean furnaces having the approximate dimensions and operated under the conditions set forth in the following table.

Table II

|  | Ref. numeral 55 (Fig. 2) | Ref. numeral 44 (Fig. 3) |
|---|---|---|
| Combustion zone | 15" diam. x 4¾" long | 33" diam. x 12" long. |
| Reaction zone | 4" diam. x 5' long | 12" diam. x 11'4" long. |
| Refractory liner | mullite | mullite. |
| Oil feed rate | 30 gal. per hr | 225 gal. per hr. |
| Jacket air | 1,000 cu. ft. per hr | 4,000 cu. ft. per hr. |
| Tang. fuel gas | 1,600 cu. ft. per hr | 9,350 cu. ft. per hr. |
| Tang. air | 24,000 cu. ft. per hr | 140,000 cu. ft. per hr. |
| Comb. zone temp | 2,600°–2,700° F | 2,600°–2,700° F. |
| Tang. air/gas ratio | 15/1 | 15/1. |

Why when using feed stock resulting from the solvent extraction of fluid catalytic cracked oils in the small size reactor would cause slagging and when used in the large size reactor does not cause slagging, I do not know.

However, I have found that when such a solvent extract oil feed, which without any additional treatment causes slagging in a small size carbon black reactor, is distilled and the distillate oil is used as charge stock to the small carbon black reactor slagging of the refractory liner does not occur and that when the still bottoms is fed to the large size carbon black reactor furnace slagging of the refractory liner still does not occur.

Upon inspection of Table 2 it is seen that the combustion and reaction zones of the small size carbon black furnace are considerably smaller than the corresponding zones of the large size furnace. Both furnaces were lined with the same mullite refractory. The large furnace has a greater capacity than the smaller furnace and accordingly all materials fed to the large furnace were in larger volumes than the same materials fed to the smaller furnace. The temperatures in the combustion zone of both furnaces were substantially the same, that is, from 2,600° to 2,700° F. These temperatures were determined by shutting down the furnace and sighting through the length of the reaction zone with an optical pyrometer to a combustion zone wall. Upon an inspection of Table 2 it is further noted that the tangentially added fuel gas and air in both furnaces have the same 15:1 air-gas ratio.

In the solvent extraction operation utilizing one or more of the light cycle oil, heavy cycle and decant oil, a solvent which is preferential to aromatic hydrocarbons is used. In other words, it is desired to extract the more aromatic content of these oils from the less aromatic content so as to produce the most high aromatic oil possible. As illustrative of such extraction solvents which I find are suitable for carrying out the process of my invention are the following: liquid sulfur dioxide, furfural, nitrobenzene, methyl Cellosolve, and other known selective solvents which are preferential to aromatic hydrocarbons can be used. However, I have preferred to use sulfur dioxide.

In the drawing, Figure 1 illustrates in diagrammatic form, a preferred arrangement of apparatus parts for carrying out the process of my invention.

Figure 2 is a longitudinal view, partly in section, of a small size carbon black production furnace.

Figure 3 is a longitudinal view, partly in section, of a large size carbon black production furnace.

Referring to the drawing and specifically to Figure 1, a light cycle oil from pipe 15, a heavy cycle oil from pipe 16 and a decant oil from pipe 17, from sources, not shown, are combined and are passed through a common feed pipe 11 into a solvent extraction vessel 12. Liquid sulfur dioxide, for example, is introduced through a pipe 21 from a run storage tank 20 into the upper portion of this extractor. Extract phase is withdrawn through a pipe 14 while a raffinate phase is withdrawn from the top through a pipe 13. This raffinate phase can be passed directly to such disposal as desired, or it can be passed to a sulfur dioxide recovery zone, such as a flash vessel or a still or both in case the sulfur dioxide content of the raffinate phase warrants recovery. The details of operation of the solvent extractor will not be given in detail because the operation of such extraction processes are well understood by those skilled in the art. The extract phase withdrawn from the extractor through line 14 is passed to a solvent removal or recovery system 18. This solvent recovery system consists of one or more flash vessels in which the larger portion of the sulfur dioxide is flashed from the extract oil. That portion of sulfur dioxide which is not flashed by pressure reduction is treated in a still for its removal. The flash vessels with or without a still is intended to be included within the solvent removal system 18. If a flash vessel or a still in this solvent removal system is to be operated under vacuum, a vacuum pump, not shown, is attached to a line 23.

When the extract oil has been processed by the solvent removal system and it is removed therefrom through a pipe 25 it is free or substantially free from sulfur dioxide. However, to make certain that all traces of sulfur dioxide are removed a small amount of anhydrous ammonia is added from a source, not shown, from a pipe 26 into pipe 25. On passage through pipe 25 and further through a pipe 27 the ammonia neutralizes residual sulfur dioxide to make the oil free from acid so as not to corrode equipment.

The oil from pipe 27 is passed into a heater 28 and then through a pipe 29 into a still 30. This still 30 is so operated that most of the oil feed is removed as distillate oil or oils and only a very minor proportion is removed through a pipe 40 as bottoms. Overhead oil vapors removed from this still through pipe 31, are condensed in condenser 32 and the condensate is passed through a pipe 33 into an accumulator vessel 34. In case pressure reduction is required in this accumulator vessel a valved pipe 35 is provided. The condensate from accumulator 34 is removed therefrom through a pipe 36 and that portion required for refluxing is passed into the column through a reflux pipe 37 and the remainder is passed on through either pipe 24 or pipe 38 or both. A side draw pipe 51 is shown attached to still 30 at a point somewhat above the level of introduction of feed to the column so that all oil removed through pipe 51 will be distillate oil. A pipe 40 conducts the bottoms product from still 30 to a run tank 41. Similarly pipe 51 is attached to a run tank 52 for receiving the side stream distillate.

In case it is desired to distill only a fraction of the solvent extract oil, a pipe 39 connects pipe 25 with pipe 40 so that a portion of the extract oil can by-pass the heater and still and can be conducted directly into the feed to one of the carbon black reactors. Distillate oil from run tank 52 is passed through pipe 53 as oil feed to a small carbon black reactor furnace 55. Fuel gas, and air for combustion of this fuel, are introduced through pipes 57 and 56, respectively, into the reactor furnace 55 the operation of which is fully explained in the above-mentioned patent. Effluent gases containing carbon black in suspension are removed from the reactor 55 through a pipe 58. Water from a pipe 59 is sprayed into the effluent gases to cool some to arrest further reaction. The cooled furnace effluent is passed on through pipe 58 to a carbon black separation or recovery means 61. This carbon black recovery or separation means is a Cottrell separator or a bag filter system or both, with or without a cyclone separator system. Effluent gases from separator 61 are removed through a conduit 63 for such disposal as desired, while the carbon black separated therefrom is removed through a conduit 62 and is passed to pelleting, packaging, or to storage or subsequent use as desired.

The bottoms oil which is run into the run storage tank 41 is removed therefrom through a pipe 43 and is fed to a large size carbon black reactor furnace 44. Fuel gas, and air, for its combustion, pass from sources, not shown, through pipe 46 and 45, respectively, and are introduced tangentially into this furnace. This furnace 44 is also operated according to the method of furnace operation fully described in the above-mentioned patent. Effluent gases containing carbon black in suspension are removed from the reactor furnace 44 through a pipe 47 and are cooled with water from a pipe 60 for arresting further reaction. The cool effluent containing carbon black is passed on through pipe 47 into a carbon black recovery or separating means 48 which, like separator 61, is a Cottrell separator, a bag filter system, or both, and with or without cyclone separator system. Off gas is removed from this separator 48 through a pipe 49 for such disposal as desired while the carbon black is removed through a pipe 50 for a similar or different disposal.

Solvent recovered from the extract phase in the solvent removable system 18 is passed therefrom through a pipe 19 to the solvent run storage tank 20. Make-up solvent for the system is added through a pipe 22 as needed.

In case it is desired to add anhydrous ammonia to the feed to the carbon black reactor 55 a pipe 54 is provided. Ammonia may be needed under some conditions for neutralization of final traces of sulfur dioxide in case anhydrous ammonia has not been added through pipe 26 into the extract oil in pipe 25 as hereinabove mentioned.

Under some conditions it may be desired to combine a portion of the condensate from the accumulator vessel 34 with the sidestream distillate oil and using these combined oils as feed to the small carbon black reactor 55.

Under other conditions it may be desired to combine a portion of the distillate from accumulator 34 with the bottoms product from still 30, and to employ these combined oils as feed to the carbon black reactor 44. Reasons for adding the oil from accumulator 34 to the bottoms product from pipe 40 will be explained hereinbelow.

As an example of the overhead oil such as would be received in accumulator 34 and of the oil withdrawn as a side stream through pipe 51, and of the still bottoms withdrawn through pipe 40, are the following data

*Table III*

| Stream | Charge to Fractionator | Overhead Cut | Residue | Side Stream or "Heart" Cut |
|---|---|---|---|---|
| Gravity,° API at 60° F | | 26.2 | 6.9 | 12.7 |
| Distillation (760 mm. Hg): | | | | |
| IBP, °F | | 240 | 535 | 517 |
| 5% evaporated | | 404 | 577 | 541 |
| 10% evaporated | | 419 | 591 | 555 |
| 20% evaporated | | 432 | 615 | 568 |
| 30% evaporated | | 445 | 635 | 583 |
| 40% evaporated | | 451 | 653 | 595 |
| 50% evaporated | | 458 | 671 | 608 |
| 60% evaporated | | 462 | 690 | 623 |
| 70% evaporated | | 468 | 709 | 645 |
| 80% evaporated | | 475 | 733 | 673 |
| 90% evaporated | | 483 | 772 | 714 |
| 95% evaporated | | 489 | | 765 |
| End Point, °F | | 529 | 772 | 772 |
| Recovery, vol. percent | | 99.0 | 90.0 | 96.0 |
| Residue, vol. percent | | 1.0 | 10.0 | 4.0 |
| Loss, vol. percent | | 0.0 | 0.0 | 0.0 |
| BMCI [1] | 88.0 | 63.7 | 104.9 | 90.0 |
| Vol. percent of Charge | 100.0 | 20.0 | 15.0 | 65.0 |

[1] Bureau of Mines correlation index:

$$C.I. = \frac{48640}{K} + 473.7G = 456.8$$

$K$ = Average B. P. °K. of the fraction.
$G$ = Specific gravity at 60° F./60° F.

It will be noted from the data of Table III that the Bureau of Mines correlation index of the overhead distillate is 63.7 while that of the side stream or heart cut fraction is 90.0 and that of the still bottoms is 104.9. The Bureau of Mines correlation index is an indication of the aromaticity of an oil. The higher the numerical value of the correlation index the greater is the aromaticity of a given oil. Thus, it is obvious then that the still bottoms having a Bureau of Mines correlation index of 104.9 is more aromatic than the overhead distillate or the side stream. It is noted also that the Bureau of Mines correlation index of the oil which was fractionated to yield the three oils for which distillation data are given has a correlation index of 88.0. It is further noted that the correlation index of the side stream or "heart cut" is 90 while that of the overhead distillate is 63.7. A blend of the overhead distillate (correlation index 63.7) and the side stream oil (correlation index 90) has a correlation index well below 88. When it is desired that the feed oil to the small carbon black reactor 55 have as high a Bureau of Mines correlation index as possible the overhead distillate from accumulator 34 is not combined with the side stream oil as feed to carbon reactor 55. The overhead distillate however, combined with the still bottoms as feed to the large carbon black reactor 44. In this manner only the side stream or heart cut oil from accumulator 52 is used as the feed to the small carbon black reactor 55. In this manner the carbon black produced in the reactor 55 from the high aromatic oil feed is of excellent quality and high in yield per gallon of charge oil. Also it might be further stated that under these conditions, that is, with the side stream or heart cut oil from pipe 51 being used as charge to the small carbon black reactor the refractory lining in this reactor does not slag in any manner whatever even over long periods of commercial operation. By period of commercial operation I mean periods extending from one week to one or more months. When a slightly lower Bureau of Mines correlation index oil feed can be tolerated in the small carbon black reactor 55 all or a portion of the overhead distillate from accumulator 34 is passed through pipe 36 and through the by-pass pipe 38 into the feed to this small reactor.

Still bottoms from still 30, with or without overhead distillate oil from accumulator 34, is utilized as feed stock for carbon black production in the large size reactor 44 for commercially long periods of time without any refractory slagging in the furnace. Why this large size reactor 44 should operate without slagging when using still bottoms from pipe 40 is not known, when, if the same still bottoms were charged to the small reactor, refractory slagging would occur. Solvent extract from pipe 25 when charged to the large reactor 44 does not cause slagging while if the same stock is charged to the small reactor 55 slagging does occur.

Figure 2 of the drawing illustrates in a very diagrammatic form the general construction and the general shape of the small carbon black reactor. In Figure 2 the reference numeral 64 identifies a steel shell within which is disposed an insulation material 65. This insulation material 65 is held in place by a refractory liner 66 which forms a combustion zone 67 and a reaction zone 68. Reference numeral 70 indicates the end of a burner tube or opening through the wall of the combustion zone for introduction of fuel gas and air for heating the furnace. The axis of this tube is so disposed that the tube is substantially tangential to the inner cylindrical wall of the combustion zone so that when the incoming combustion mixture is introduced at a very high velocity the flame and combustion products enter the combustion zone tangentially. The combustion gases then follow a spiral path while passing through the combustion zone. When these gases reach the approximate center of the combustion zone they enter the long reaction zone and follow a helical path therethrough. Oil feed in the vapor state is introduced into the combustion zone through an oil feed pipe 69. Surrounding this oil feed pipe 69 is a jacket which is connected to a pipe 87 for supplying air for the purpose of preventing deposition of carbon on the end of the oil feed pipe 69 within the furnace.

In Figure 3 the furnace 44 is of the same general construction as the furnace illustrated in Figure 2 but as mentioned hereinbefore it is larger in size. This large size furnace comprises a steel shell 81 in which is disposed an insulating material 82. A refractory liner 83 defines a combustion zone 85 and a reaction zone 84. Reference numeral 86 identifies the oil which feed pipe for introducing feed oil in the vapor state. A pipe 88 conducts air to a jacket surrounding pipe 86 for introduction of air to the inner end of feed pipe 86 to keep it clean from carbon. Port 89 is an opening or pipe extending through the wall of the combustion zone in such a manner that the fuel gas and air mixture flowing through port 89 enters the combustion zone in a direction tangent to the inner cylindrical wall. The patterns followed by these gases through furnace 44 are the same as explained relatively to furnace 55 of Figure 2. As mentioned hereinbefore both of these furnaces have the general conformity and are constructed in the manner fully described in said hereinbefore mentioned patent U. S. 2,564,700.

In the carbon black furnace illustrated in Figures 2 and 3, the reaction chamber 68 of Figure 2 was 4 inches in diameter and 5 feet in length while the reaction chamber of Figure 3 was 12 inches in diameter and 11 feet 4 inches long. The combustion zone of Figure 2 was 15 inches in diameter by 4¾ inches long and the combustion zone of Figure 3 was 33 inches in diameter and 1 foot in length. Combustion zone temperature in both furnaces were 2600° to 2700° F. with a tangential fuel gas/air ratio of 15 to 1. Oil feed rate to the larger furnace was 225 gallons of liquid (in the vapor state) per hour and to the smaller furnace was 30 gallons per hour (as vapor). Why the small furnace will slag and the large furnace will not slag when using a feed stock blend of a light cycle oil, a heavy cycle oil, and a decant oil, all from a fluidized catalytic cracking operation, I do not know. I found, however, that when the side stream oil from such a still as still 30 when fed to a small carbon black production furnace, as that illustrated in Figure 2, the mullite refraction liner does not discolor and slag, while the original extract oil, the still bottoms and overhead oil from such a still as still 30, as separate oils or as a blend of any two or of all three of these oils do not slag the mullite liner in such a carbon black furnace as that illustrated in Figure 3.

One important difference in the carbon black made in the small furnace in contrast to that made in the large furnace is a rubber compounded with the small furnace carbon black has about a 25% greater resistance to abrasion than a rubber compounded with carbon black made in the large furnace.

In the solvent extraction operation carried out in extractor 12, I have mentioned use of liquid sulfur dioxide as the extraction solvent. I do not wish to be limited to this one extraction solvent because other solvents selective to aromative hydrocarbons are used under some conditions. Such other solvents as furfural, methyl Cellosolve, nitrobenzene and others which selectively extract the more aromatic hydrocarbons from hydrocarbon mixtures containing these and less aromatic and even non-aromatic hydrocarbons are suitable for use in my process.

While the above flow diagram has been described for illustrative purposes, the invention obviously is not limited thereto.

I claim:

1. In a furnace carbon black production operation wherein an extract oil, produced by the solvent extraction of an oil comprising a decant oil produced in a catalytic cracking operation, a heavy cycle oil and a light cycle oil, with a solvent preferentially selective to aromatic hydrocarbons, when charged to a small carbon black production furnace having a refractory lining and operated under carbon black producing conditions causes slagging of the refractory lining of said small furnace, and when charged to a large carbon black production furnace having a refractory lining similar to that of said small furnace and operated under carbon black producing conditions without causing slagging of the refractory lining of said large furnace, the method of conducting the carbon black producing operation without slagging the refractory liner of said small carbon black production furnace, comprising distilling said extract oil to produce an overhead distillate oil, a bottoms product oil and an oil having a boiling range intermediate the boiling ranges of said distillate oil and said bottoms product oil, charging the oil of intermediate boiling range to said small carbon black production furnace and therein partially burning the charged oil under carbon black producing conditions similar to the aforesaid carbon black producing conditions in said small furnace whereby slagging does not occur on the refractory walls of said small carbon black producing furnace, charging the overhead distillate oil and the bottoms product oil to said large carbon black production furnace and therein partially burning the charged combined oils under carbon black producing conditions whereby slagging does not occur on the walls of said large furnace, and recovering carbon black from both carbon black producing furnaces.

2. In the operation of claim 1, combining said overhead distillate oil and said bottoms product oil with an additional quantity of said extract oil and charging these combined oils as feed to the large carbon black production furnace.

3. In the process of claim 1 wherein said extract oil is produced in an extraction operation wherein sulfur dioxide is the extraction solvent.

4. In the process of claim 2 wherein said extract oil is produced in an extraction operation wherein sulfur dioxide is the extraction solvent.

5. In a furnace carbon black production operation wherein an extract oil, produced by the solvent extraction of an oil comprising a decant oil produced in a catalytic cracking operation, a heavy cycle oil and a light cycle oil, with a solvent preferentially selective to aromatic hydrocarbons, when charged to a small carbon black production furnace having a refractory lining and operated under carbon black producing conditions causes slagging of the refractory lining of said small furnace, and when charged to a large carbon black production furnace having a refractory lining similar to that of said small furnace and operated under carbon black producing conditions without slagging of the refractory lining of said large furnace, the method of conducting the carbon black producing operation without slagging the refractory liner of said small carbon black production furnace, comprising distilling said extract oil to produce a distillate oil and a bottoms product oil, charging the distillate oil to said small carbon black production furnace and therein partially burning the charged oil under carbon black producing conditions similar to the aforesaid carbon black producing conditions in said small furnace whereby slagging does not occur on the refractory walls of said small carbon black producing furnace, charging the bottoms product oil to said large carbon black production furnace and therein partially burning the bottoms product oil under carbon black producing conditions whereby slagging does not occur on the walls of said large furnace, and recovering carbon black from both carbon black producing furnaces.

6. In the operation of claim 5 combining said bottoms product oil with an additional quantity of said extract oil and charging this combined oil as feed to the large carbon black production furnace.

7. In the process of claim 5 wherein said extract oil is produced in an extraction operation wherein sulfur dioxide is the extraction solvent.

8. In the process of claim 6 wherein said extract oil is produced in an extraction operation wherein sulfur dioxide is the extraction solvent.

9. In the process of claim 1 wherein said extract oil is produced in an extraction operation wherein furfural is the extraction solvent.

10. In the process of claim 1 wherein said extract oil is produced in an extraction operation wherein methyl Cellosolve is the extraction solvent.

11. In the process of claim 1 wherein said extract oil is produced in an extraction operation wherein nitrobenzene is the extraction solvent.

12. In the process of claim 5 wherein said extract oil is produced in an extraction operation wherein furfural is the extraction solvent.

13. In the process of claim 5 wherein said extract oil is produced in an extraction operation wherein methyl Cellosolve is the extraction solvent.

14. In the process of claim 5 wherein said extract oil is produced in an extraction operation wherein nitrobenzene is the extraction solvent.

15. In a furnace carbon black production operation wherein an extract oil, produced by the solvent extraction of an oil comprising a decant oil produced in a catalytic cracking operation, a heavy cycle oil and a light cycle oil, with a solvent preferentially selective to aromatic hydrocarbons, when charged to a small carbon black producing furnace operating under carbon black producing conditions causes slagging of the refractory liner of the furnace, the method of conducting the carbon black producing operation without slagging the refractory liner of said small furnace, comprising distilling said extract oil to produce an overhead distillate oil, a bottoms product oil and an oil boiling intermediate said overhead oil and said bottoms product oils, charging only the intermediate boiling oil to said carbon black producing furnace and therein partially burning said intermediate boiling oil under the above said conditions whereby slagging does not occur on the refractory walls of said furnace, and recovering carbon black from the furnace effluent as the carbon black product.

16. In a furnace carbon black production operation wherein an extract oil, produced by the solvent extraction of an oil comprising a decant oil produced in a catalytic cracking operation, a heavy cycle oil and a light cycle oil with a solvent preferentially selective to aromatic hydrocarbons, when charged to a small carbon black producing furnace under carbon black producing conditions causes slagging of the refractory liner of the small carbon black producing furnace, the method of conducting the carbon black producing operation without slagging the refractory liner of the small carbon black producing furnace, comprising distilling said extract oil to produce a distillate oil and a bottoms oil, charging only the distillate oil to the small carbon black producing furnace and therein partially burning said distillate oil under said carbon black producing conditions whereby slagging does not occur on the refractory walls of the small carbon black producing furnace, and recovering carbon black from the furnace effluent as the carbon black product.

17. In the method of claim 16, wherein the solvent extraction is carried out by use of a liquid sulphur dioxide as the solvent.

References Cited in the file of this patent

UNITED STATES PATENTS

| | | |
|---|---|---|
| 2,115,144 | Keith, Jr. | Apr. 26, 1938 |
| 2,516,134 | Molique | July 25, 1950 |
| 2,558,838 | Goodson | July 3, 1951 |
| 2,608,470 | Helmers et al. | Aug. 26, 1952 |
| 2,625,466 | Williams | Jan. 13, 1953 |
| 2,660,552 | Blanding | Nov. 24, 1953 |
| 2,693,441 | Helmers | Nov. 2, 1954 |